M. J. STEVENS.
Check-Row Attachments for Corn-Planters.
No. 157,885. Patented Dec. 15, 1874.
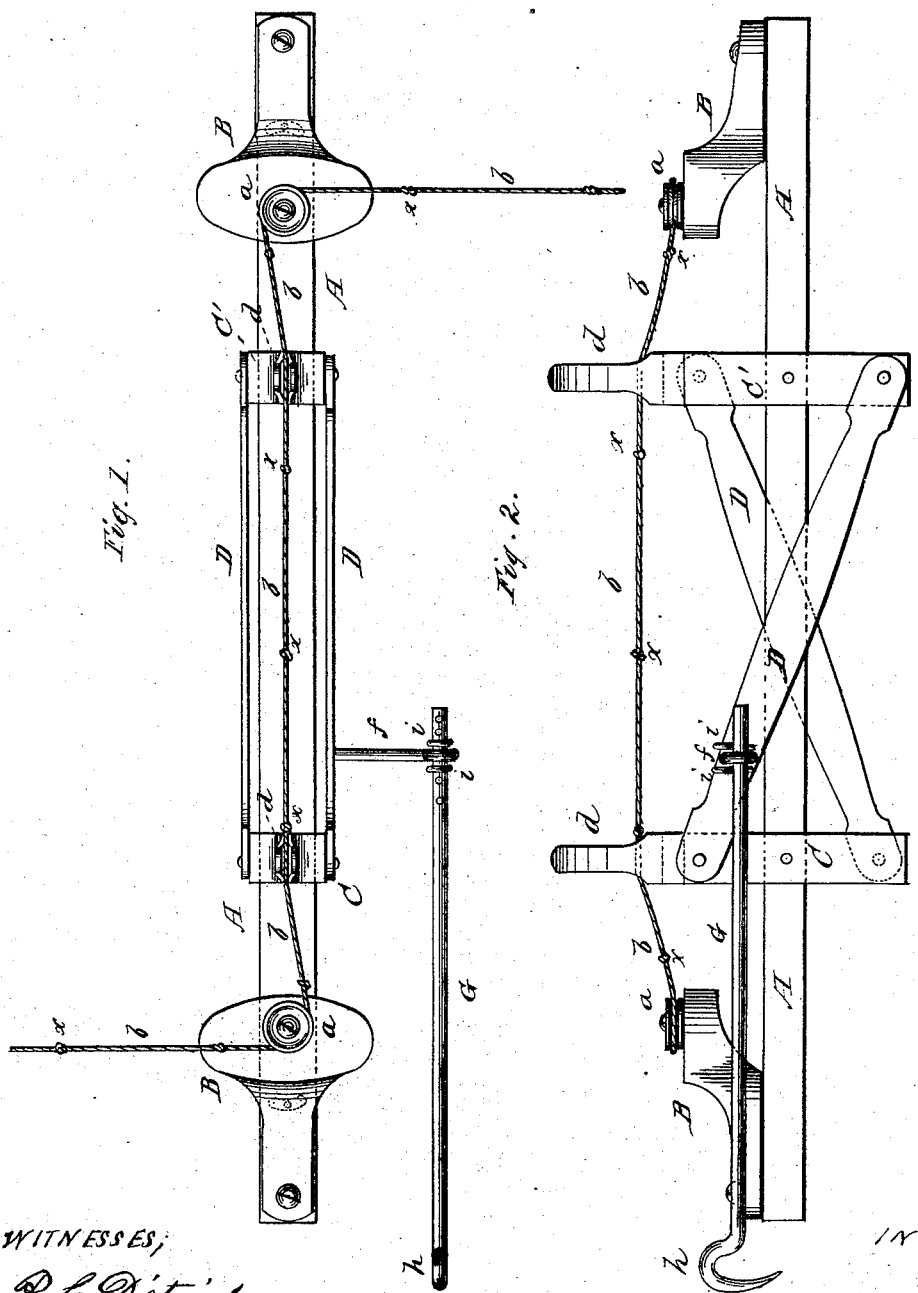
WITNESSES;
P. C. Dieterich
W. C. McArthur
INVENTOR:
M. J. Stevens
per:
T. H. Alexander
ATTORNEY.

UNITED STATES PATENT OFFICE.

MARCUS J. STEVENS, OF URBANA, ILLINOIS.

IMPROVEMENT IN CHECK-ROW ATTACHMENTS FOR CORN-PLANTERS.

Specification forming part of Letters Patent No. 157,885, dated December 15, 1874; application filed October 30, 1874.

*To all whom it may concern:*

Be it known that I, M. J. STEVENS, of Urbana, in the county of Champaign and State of Illinois, have invented certain new and useful Improvements in Attachments for Corn-Planters; and I do hereby declare that the following is a full, clear, and exact description thereof, reference being had to the accompanying drawings, and to the letters of reference marked thereon, which form part of this specification.

The nature of my invention consists in the construction and arrangement of a check-row attachment for corn-planters, as will be hereinafter more fully set forth.

In order to enable others skilled in the art to which my invention appertains to make and use the same, I will now proceed to describe its construction and operation, referring to the annexed drawing, in which—

Figure 1 is a plan view, and Fig. 2 is a side elevation, of my invention.

A represents a beam or bar, to be attached to or form part of a frame of a corn-planter, and on each end of this beam is a block, B, having a pulley, a, mounted upon it. Around these pulleys passes an endless cord, b, as hereinafter described, which cord is provided its entire length with knots or projections x x at regular intervals. C C' represent two stirrups, straddling and pivoted to the beam A at suitable distances apart. Each stirrup has at its upper end an arm, d, which is split or slotted for the cord b to pass through, and these slots or slits are made tapering, so as to be wider at the outer ends of the arms than at the inner. The upper end of each stirrup is, by a bar, D, connected with the lower end of the other, said bars D D being pivoted to the stirrups, and running one on each side of the beam A. From one of the bars D projects an arm, f, which has a hole in its outer end for the insertion of a rod, G, which is held by a key, i, passing through one of a series of holes in said rod. The other end of the rod G is formed with a hook, h, to be fastened to the slide or valve of the planter.

The endless cord b is stretched across the field to be planted, and fastened to a pin at each end. It is then placed on the right-hand pulley a, passed through the arms d d, and wound around the left-hand pulley, after which the end is fastened by a pin to the ground. As the planter moves forward the cord b will pass through the arms d d, dropping corn for every knot x on the cord.

After crossing the field the cord is thrown from the check-row and the planter turned around. The cord is then placed on the left-hand pulley and through the arms d d, and around the pulley on the right-hand side, and fastened to the ground by a pin. Then the planter moves forward and the corn is dropped as before.

The cord remains across the field all the time. This will check the corn so that it can be plowed both ways.

This check-row attachment may be applied to any corn-planter, and by changing the key i in the different holes on the rod G, more or less throw may be given to the slide of the corn-planter.

Having thus fully described my invention, what I claim as new, and desire to secure by Letters Patent, is—

1. In a check-row attachment, the rod G, provided with a series of holes at one end and a hook at the other, and key i, combined with arm f and bar D, substantially as and for the purpose set forth.

2. The combination, in a check-row attachment, of stirrups C C', diagonal bars D D, arm f, rod G, with a series of holes at one end and means of attaching it to the machine at the other end, and key i, all constructed and arranged to operate substantially as and for the purpose set forth.

In testimony that I claim the foregoing as my own I affix my signature in presence of two witnesses.

MARCUS J. STEVENS.

Witnesses:
SAML. H. BIRNEY,
F. M. WRIGHT.